United States Patent
Behbehani

(10) Patent No.: US 8,554,283 B1
(45) Date of Patent: Oct. 8, 2013

(54) LOCATING SOFTWARE FOR SMARTPHONE AND PC

(71) Applicant: Fawzi Q. M. A. O. A. Behbehani, Salwa (KW)

(72) Inventor: Fawzi Q. M. A. O. A. Behbehani, Salwa (KW)

( * ) Notice: Subject to any disclaimer, the term of this patent is extended or adjusted under 35 U.S.C. 154(b) by 0 days.

(21) Appl. No.: 13/771,045

(22) Filed: Feb. 19, 2013

(51) Int. Cl.
*H04W 24/00* (2009.01)

(52) U.S. Cl.
USPC ............... 455/566; 455/404.1; 455/404.2; 455/456.1; 455/457; 340/8.1; 340/539.13; 715/864

(58) Field of Classification Search
USPC ............ 455/456.1–457, 566, 404.1, 404.2, 455/550.1; 340/8.1, 539.13; 715/864
See application file for complete search history.

(56) References Cited

U.S. PATENT DOCUMENTS

| | | | |
|---|---|---|---|
| 6,714,791 B2 * | 3/2004 | Friedman | 455/456.1 |
| 7,424,541 B2 | 9/2008 | Bourne | |
| 7,853,273 B2 * | 12/2010 | Beyer, Jr. | 455/457 |
| 8,023,963 B2 * | 9/2011 | Yonker et al. | 455/456.1 |
| 8,041,334 B2 * | 10/2011 | Yoon | 455/404.2 |
| 8,190,135 B2 * | 5/2012 | Gupta et al. | 455/414.3 |
| 8,385,964 B2 * | 2/2013 | Haney | 455/519 |
| 8,412,166 B2 * | 4/2013 | Ellanti et al. | 455/414.2 |
| 8,417,265 B2 * | 4/2013 | Kimishima | 455/456.6 |
| 2004/0153664 A1 | 8/2004 | Rossler et al. | |
| 2005/0085240 A1 | 4/2005 | Fitzgerald | |
| 2006/0009234 A1 * | 1/2006 | Freer | 455/456.1 |
| 2006/0166703 A1 | 7/2006 | Karaoguz et al. | |
| 2007/0161383 A1 * | 7/2007 | Caci | 455/457 |
| 2008/0045234 A1 * | 2/2008 | Reed | 455/456.1 |
| 2008/0132252 A1 * | 6/2008 | Altman et al. | 455/457 |
| 2008/0227473 A1 * | 9/2008 | Haney | 455/457 |
| 2008/0254811 A1 * | 10/2008 | Stewart | 455/456.2 |
| 2009/0149155 A1 * | 6/2009 | Grossman | 455/411 |
| 2010/0105440 A1 * | 4/2010 | Kruzeniski et al. | 455/566 |
| 2011/0070895 A1 * | 3/2011 | Ichinose | 455/456.1 |
| 2011/0201363 A1 * | 8/2011 | Shim et al. | 455/466 |
| 2011/0276639 A1 | 11/2011 | Schrader | |
| 2012/0190380 A1 | 7/2012 | Dupray et al. | |
| 2012/0309434 A1 * | 12/2012 | Swanburg et al. | 455/457 |
| 2013/0029696 A1 * | 1/2013 | Ellanti et al. | 455/457 |

* cited by examiner

*Primary Examiner* — Steven Kelley
(74) *Attorney, Agent, or Firm* — Richard C. Litman

(57) ABSTRACT

The locating software for smartphone and PC is a software application that lets people know other people's job during walking outside the house. The present software can be downloaded by a client or App store. All people can use it. It helps people to access nearby emergency services. Doctors, police, firemen and the like are immediately accessible using the present software. The present software may also be used for quickly seeking friends. The present software works with Bluetooth, Wi-Fi, 3G, GPS, and the like. The present software integrates with other communication technology that is used in smartphones and PCs. It works within Bluetooth range (about 100 feet), in homes, malls, parks, theaters, and the like.

6 Claims, 10 Drawing Sheets

| Nickname | Offer | | Show |
|---|---|---|---|
| John | Doctor Gynecologist | | ● |

| Nickname | Offer | | Show |
|---|---|---|---|
| David | Attorney Real Estate | | ● |

| Nickname | Offer | | Show |
|---|---|---|---|
| Sam | Plumber General | | ● |

| Nickname | Offer | | Show |
|---|---|---|---|
| Susan | Babysitter | | ● |

Fig. 9

LOCATING SOFTWARE FOR SMARTPHONE AND PC

BACKGROUND OF THE INVENTION

1. Field of the Invention

The present invention relates to mobile device locating services, and particularly to locating software for smartphone and PC (personal computer).

2. Description of the Related Art

While walking in the street or in a mall or park, one doesn't know what kind of job people have. In case of emergency, people need help as soon as possible, such as help from a doctor, a policeman, a fireman, etc. So it will be a great idea if one knows everyone's job instantly while walking in the street or other place. On the other hand, one needs some kind of software application to know other people's jobs to obviate the need to seek help using a telephone book, newspaper, or the like.

Thus, locating software for smartphone and PC solving the aforementioned problems is desired.

SUMMARY OF THE INVENTION

The locating software for smartphone and PC is a software application that lets people know other people's job during walking outside the house. The software can be downloaded by a client or App store. All people can use it. It helps people to access nearby emergency services. Doctors, police, firemen and the like are immediately accessible using the software. The software may also be used for quickly seeking friends. The software works with Bluetooth, Wi-Fi, 3G, GPS, and the like.

The software integrates with other communication technology that is used in smartphones and PCs. It works within Bluetooth range (about 100 feet), in homes, malls, parks, theaters, and the like.

These and other features of the present invention will become readily apparent upon further review of the following specification and drawings.

BRIEF DESCRIPTION OF THE DRAWINGS

FIG. 9 is a simulated screenshot of locating software for smartphone and PC according to the present invention, showing the people entry table displayed on the user's smartphone or PC.

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The locating software for smartphone and PC is software that lets people know other people's job during walking outside the house. The present software application can be downloaded by a client or AppStore. All people can use it. It helps people to obtain emergency assistance from nearby first responders, such as a doctor, police, firemen, etc., and may also be used to seek friends quickly. The present software application works on Bluetooth, Wi-Fi, 3G, GPS, and other communications technology that is used in smartphones and PCs. It works within Bluetooth range (about 100 feet) in homes, at the mall, and in parks, theaters, etc. The present software application utilizes all of the messaging and display features found on a typical modern smartphone. As shown in FIGS. 1A-1D, the user interface (UI) 100a-100d is consistent, regardless of the type of smartphone used.

Figure 4A:
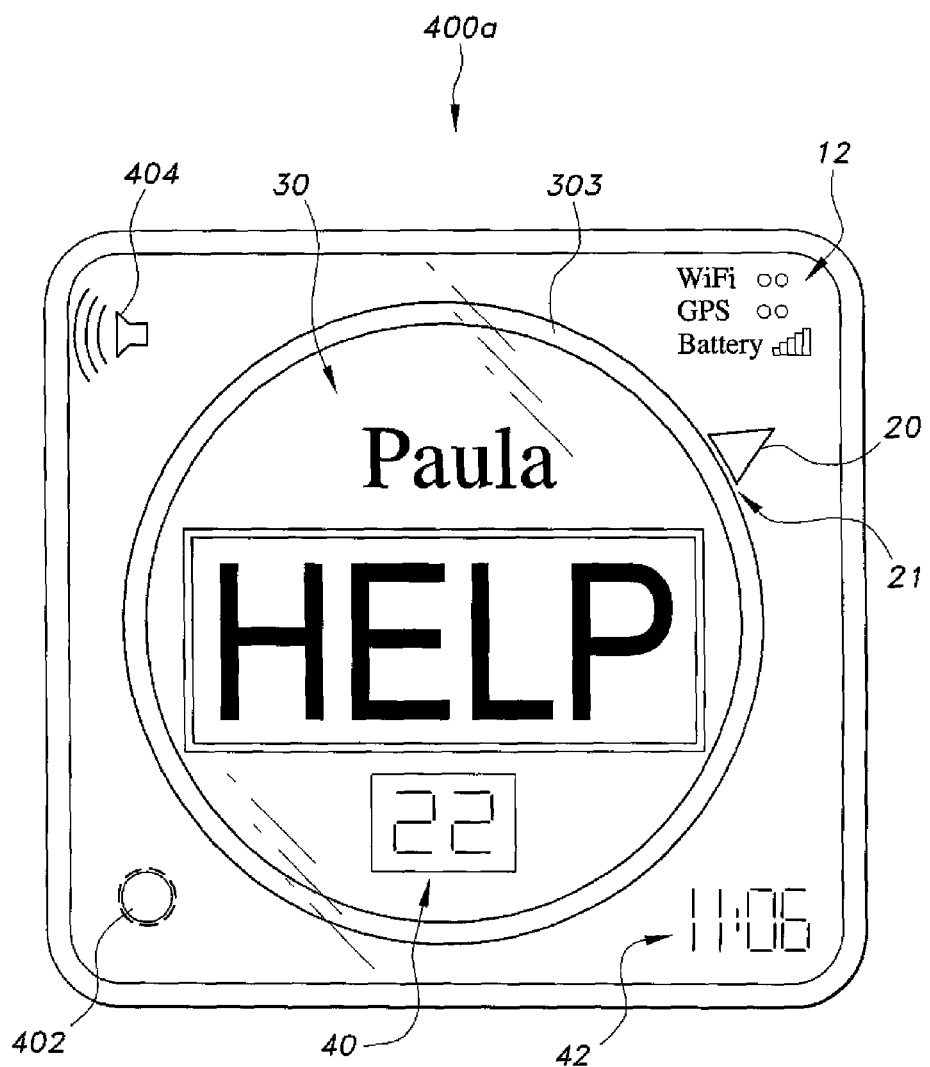
FIG. 4A is a front view of a display having locating software for smartphone and PC according to the present invention operating thereon, showing an exemplary display screen when a remote user is in distress.
Figure 4B:
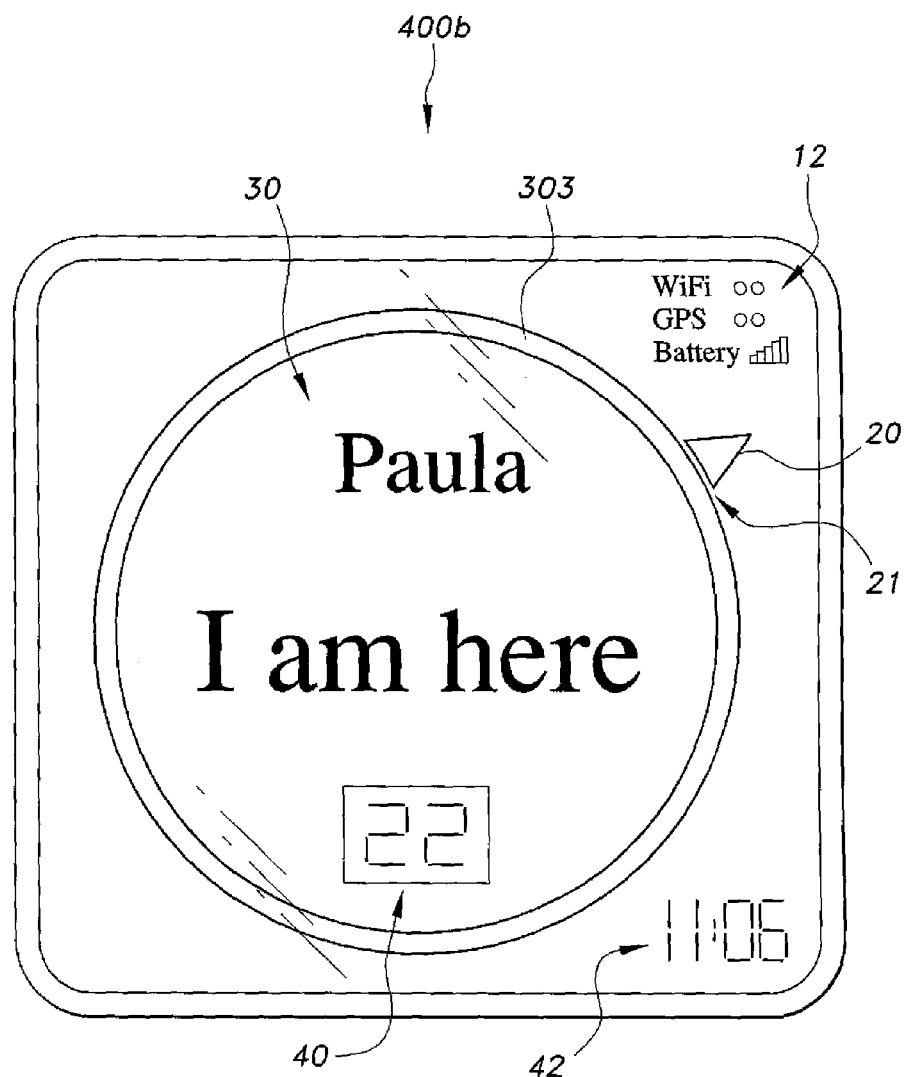
FIG. 4B is a front view of a display having locating software for smartphone and PC according to the present invention operating thereon, showing an exemplary display screen when near and remote users are known to each other.

Many examples abound. For example, if a woman needs help due to some exigency, such as robbery, pregnancy, and the like, she can find the nearest policeman or doctor in her area. The present software application will show her the professional's location, direction, and distance from her current location. Moreover, she can initiate a call to, e.g., the doctor, the present software application forming a message in Instant Messaging (IM) format, or the like, that informs the doctor of the distressed person's location, direction, and distance from the doctor. As shown in FIG. 4A, the first responder's mobile device 400a indicates that Paula needs help and her distance and direction. As shown in FIG. 4B, Paula's mobile device 400b indicates the first responder's distance and direction. A call/response button 402 initiates the call for help when Paula presses on her device, and responds with a "help is on the way" and other pertinent information when pressed by the first responder on his/her device. As shown in FIG. 4A, a beep indicator 404 is also provided in the UI and lets the user know that the messaging has been activated. There also exists a real-time indicator 42 which indicates the present time in digital format and is disposed outside of the circular range indicator 303. One proviso is that the parties be in range. One manner of determining range is the Bluetooth capability, which would set the range to approximately 100 feet. When multiple types of first responders respond to a distress geo-location call initiated by the user, the user has the option to select which type of first responder is desired.

Figure 5:
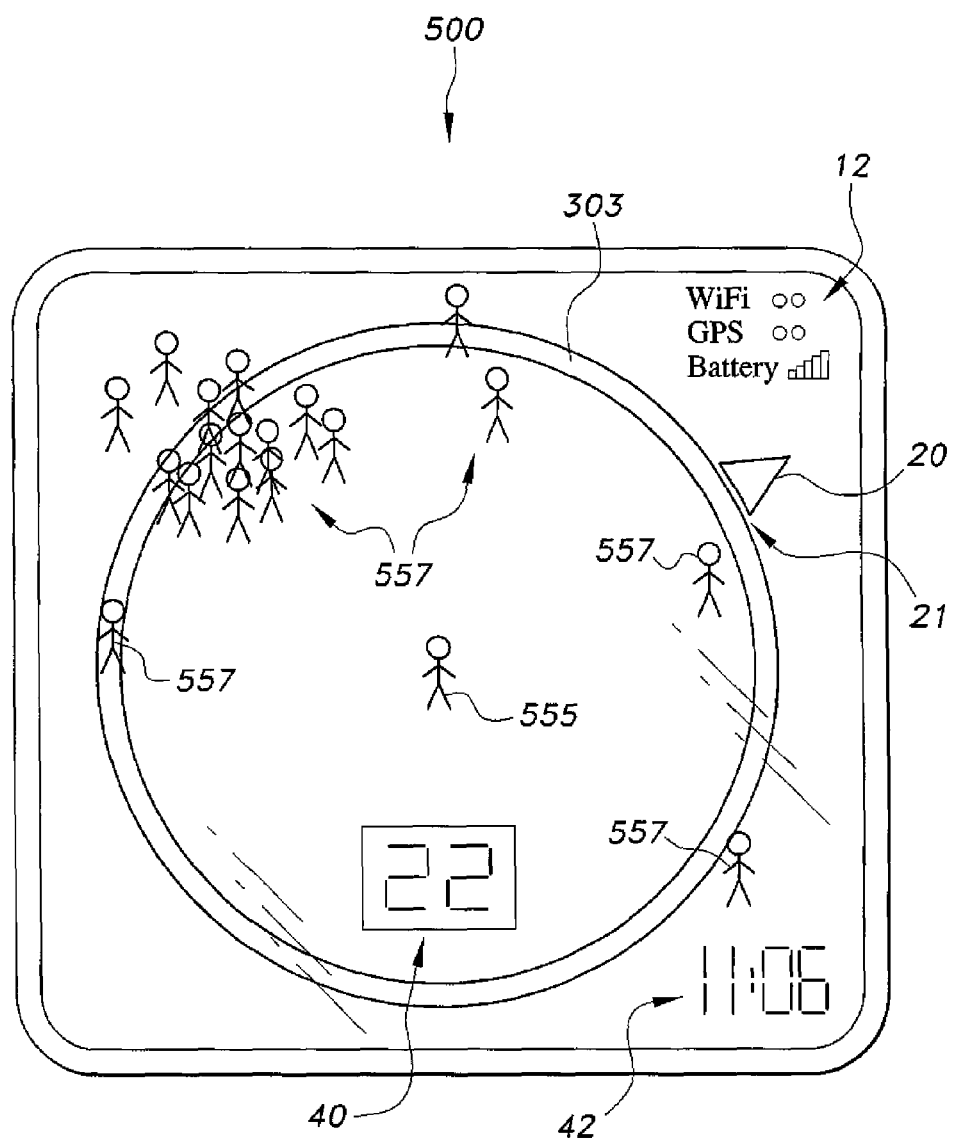
FIG. 5 is a front view of a display having locating software for smartphone and PC according to the present invention operating thereon, showing an exemplary display screen when the group display is activated.

A second example demonstrates the present software application's "quick find" feature. If some friends desire a meeting at a specific location in, for example, a mall or a park, as shown in FIG. 5, the present software application will present a display 500 that alerts the user and gives the direction and distance for every friend 557 of the user 555 who has the application turned on in his/her smartphone.

Figure 6:
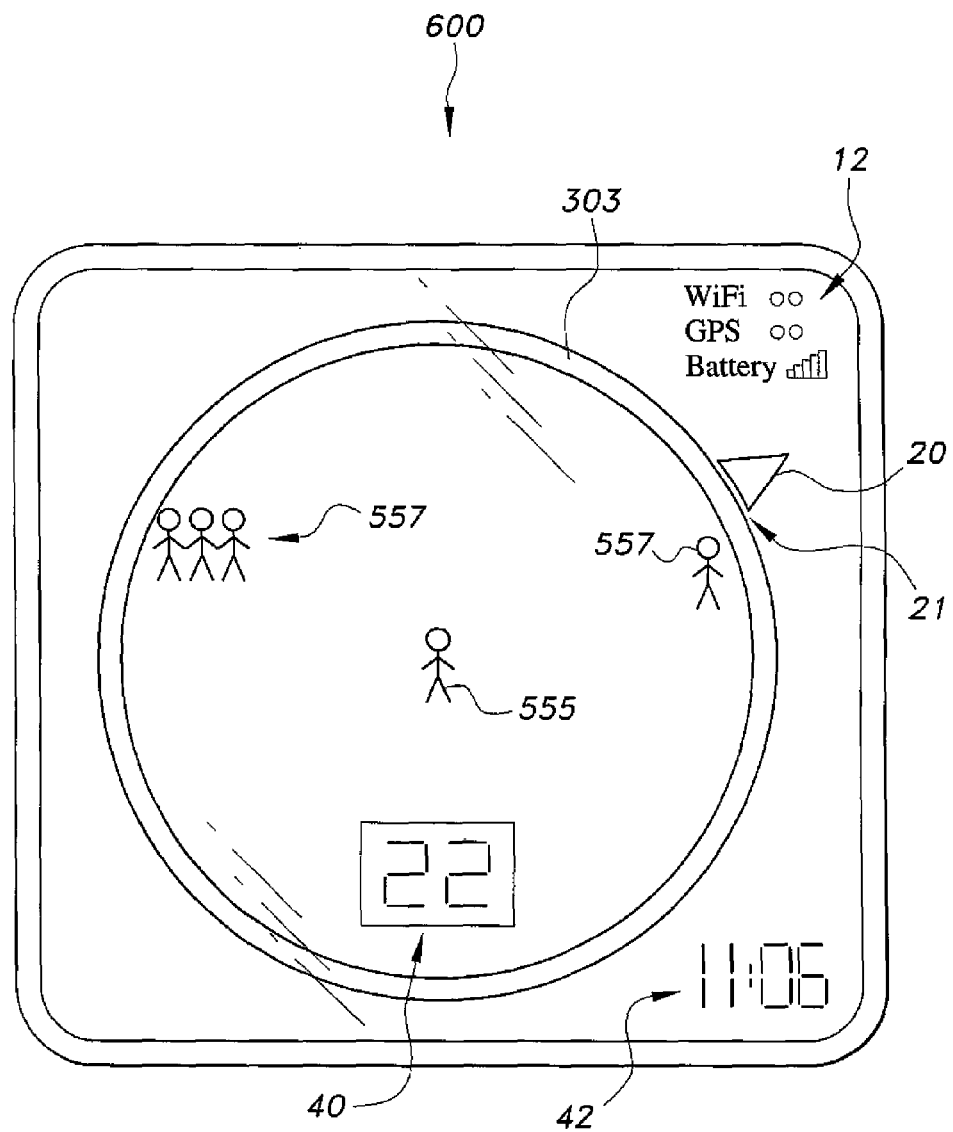
FIG. 6 is a front view of a display having locating software for smartphone and PC according to the present invention operating thereon, showing the family locator feature.

A third example provides a family security feature. When each member of a family, i.e., friend 557 of a primary user 555, has a smart mobile device enabled with the present software application, each member in any location will know the other members' location, direction and distance, as shown in display 600 of FIG. 6.

The fourth exemplary case illustrates that the present software can be used to find nearby professionals of various disciplines, not just first responders in a life-threatening situation. The professional finder feature assists the user in saving time when looking for a professional. For example, anyone who needs a plumber, attorney, or taxi in a short time does not need to look for telephone numbers and search for them. With the present application enabled, one can check the present software application and find the nearest professional of a user-designated type in the area and talk to him/her as soon as possible to make the deal.

A fifth example includes looking for a mate. For a group of people, such as artists, singers, and players, who may not know each other well, they all can set the present software application to find each other in one place, without making telephone calls and wasting time to introduce each other.

The sixth example includes a people-gathering feature. The present software application can gather people who have the same interests. Using the present software application, one can enter his/her hobby, interest, social life, etc. When other individuals with the same software application have entered the same hobby or interest or social life, the present software application will beep an alert, telling or otherwise indicating the location of the kindred souls. They then can meet and introduce themselves to each other.

Exemplary case number seven provides an advertisement feature. The present software application can formulate and display a quick and free advertisement, like David John and Sam. Interested people may reach them quickly in the same place. This will save time and effort to do it alone.

In all of the examples, it is understood that the present software application eliminates the need to spend time to look and search for help or friends calling each other to say "where are you?," or spend time looking for technicians, and it is the easy way to collect a lot of people without a telephone call.

Figure 1D:
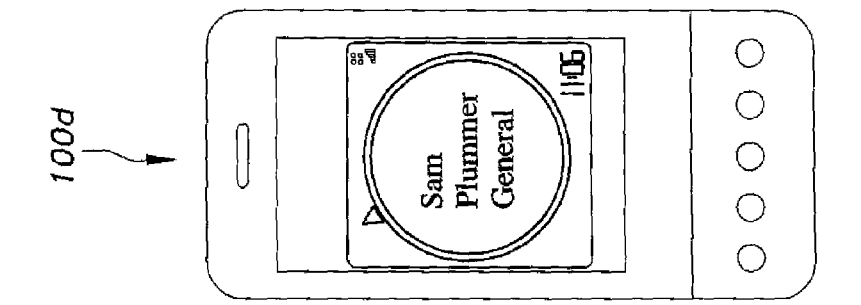
FIG. 1D is a front view of a user D's phone having locating software for smartphone and PC according to the present invention operating thereon.
Figure 1C:
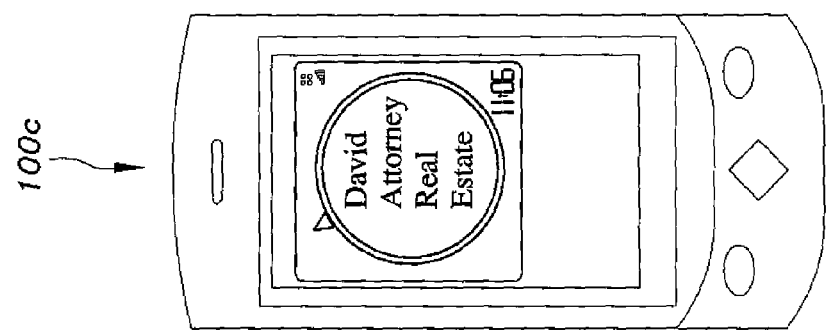
FIG. 1C is a front view of a user C's phone having locating software for smartphone and PC according to the present invention operating thereon.
Figure 1B:
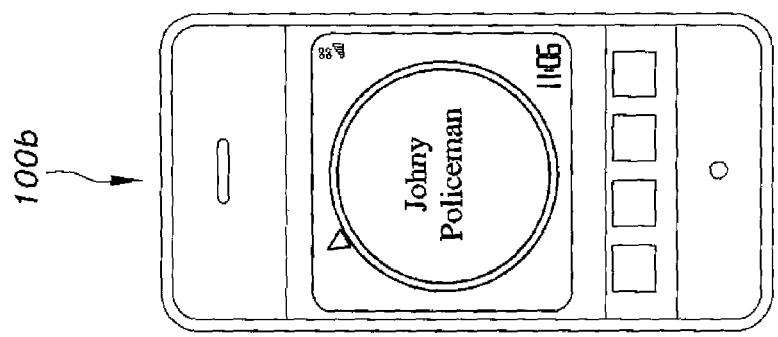
FIG. 1B is a front view of a user B's phone having locating software for smartphone and PC according to the present invention operating thereon.
Figure 1A:
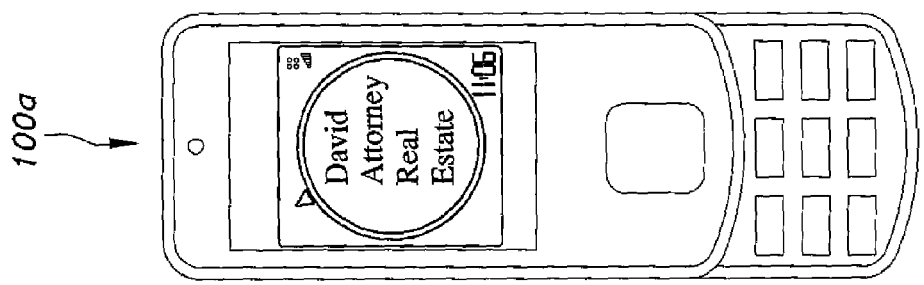
FIG. 1A is a front view of a user A's phone having locating software for smartphone and PC according to the present invention operating thereon.
Figure 2:
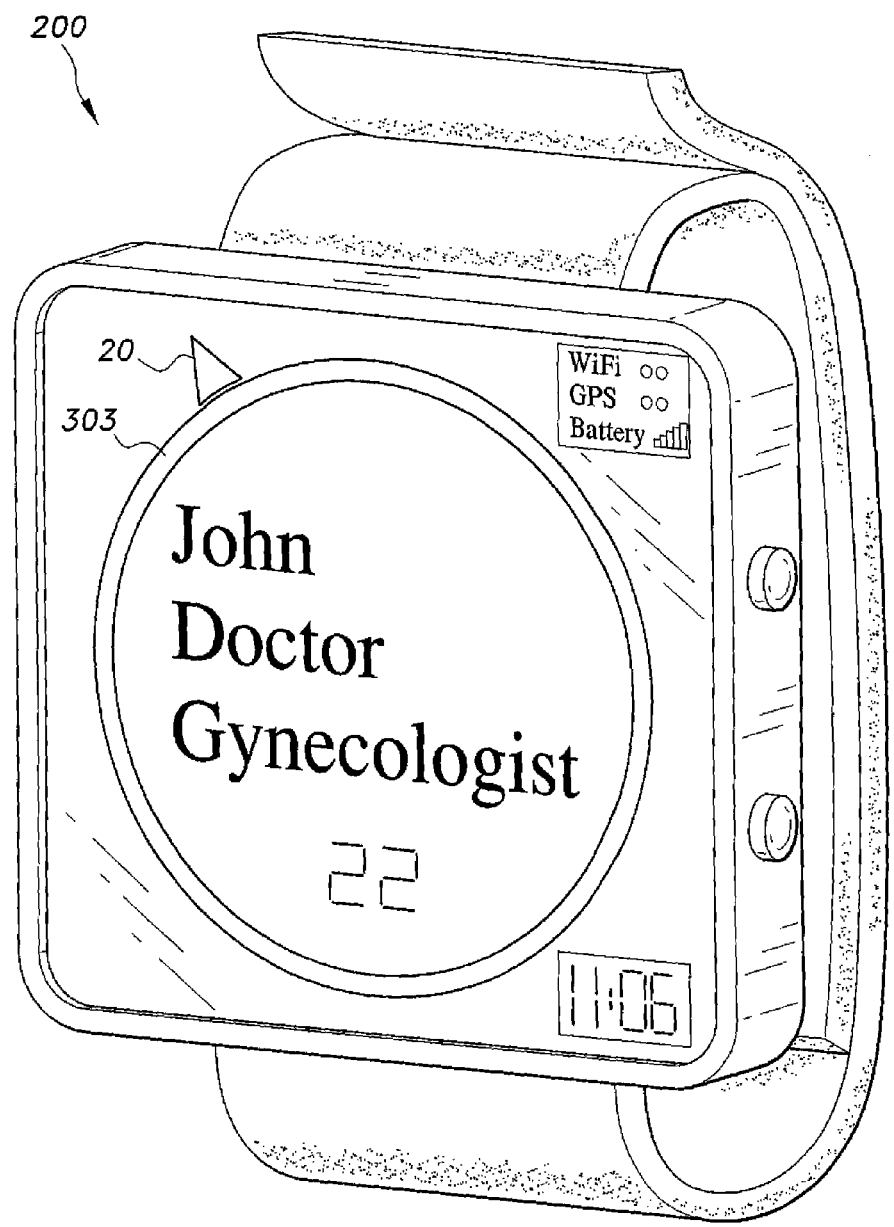
FIG. 2 is a front view of a wristwatch having locating software for smartphone and PC according to the present invention operating thereon.
Figure 3:
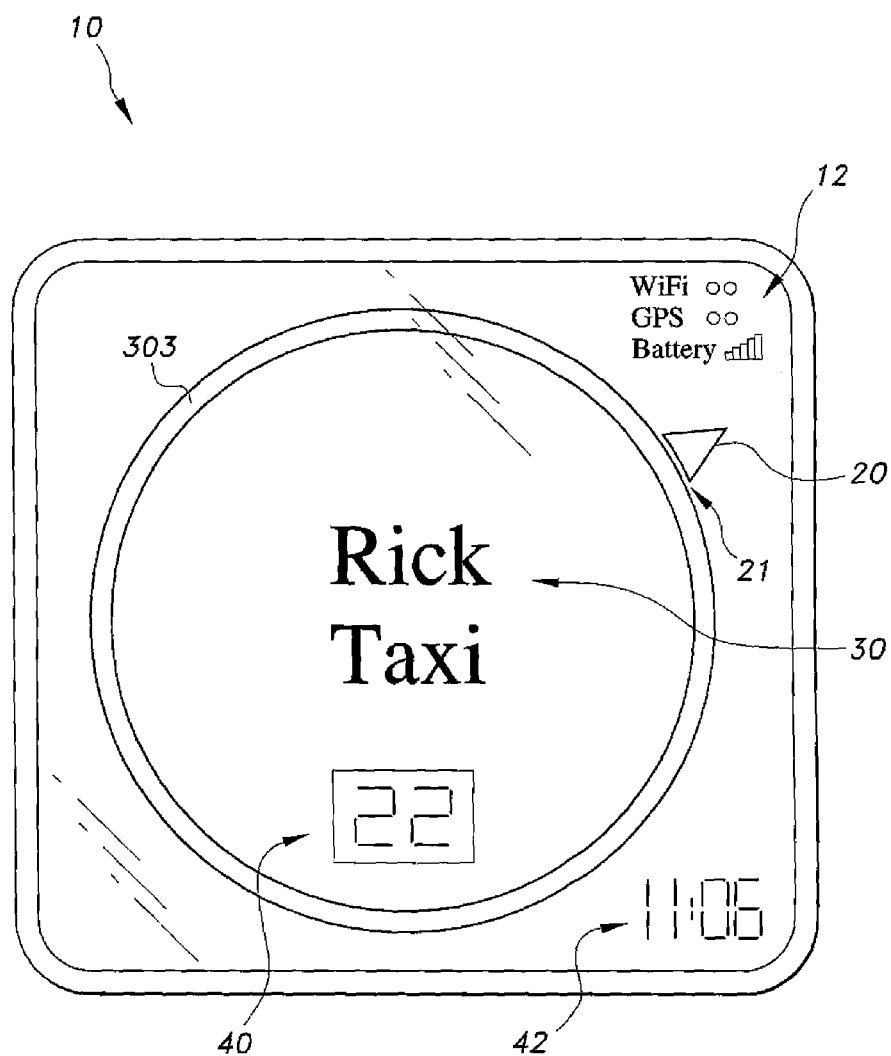
FIG. 3 is a front view of a display having locating software for smartphone and PC according to the present invention operating thereon, showing the display indicators provided by the software.

The present software application may be configured to run on a variety of platforms, including a wireless wristwatch 200, as shown in FIG. 2. As shown in FIG. 3, the UI 10 is universal, having a circular range indicator 303, a Wi-Fi, GPS and Battery indicator 12, a triangular arrow-shaped finder indicator 20, i.e., a pointer, the target person or service indication 30, which displays the target's public profile, and a distance indicator 40, which indicates distance to the target person or service 30. Visually, there is a gap 21 between the triangular arrow-shaped finder indicator 20 and the circular range indicator 303. The finder indicator 20 floats over the circular range indicator 303 while indicating the target position in a compass-like manner. For readability, the gap between the finder indicator 20 and the range indicator 303 is always maintained at a constant as the finder indicator 20 moves in a circular arc tracking above the circular display of the range indicator 303. On a PC or tablet, it will be the same interface, but on a bigger screen.

Figure 7:
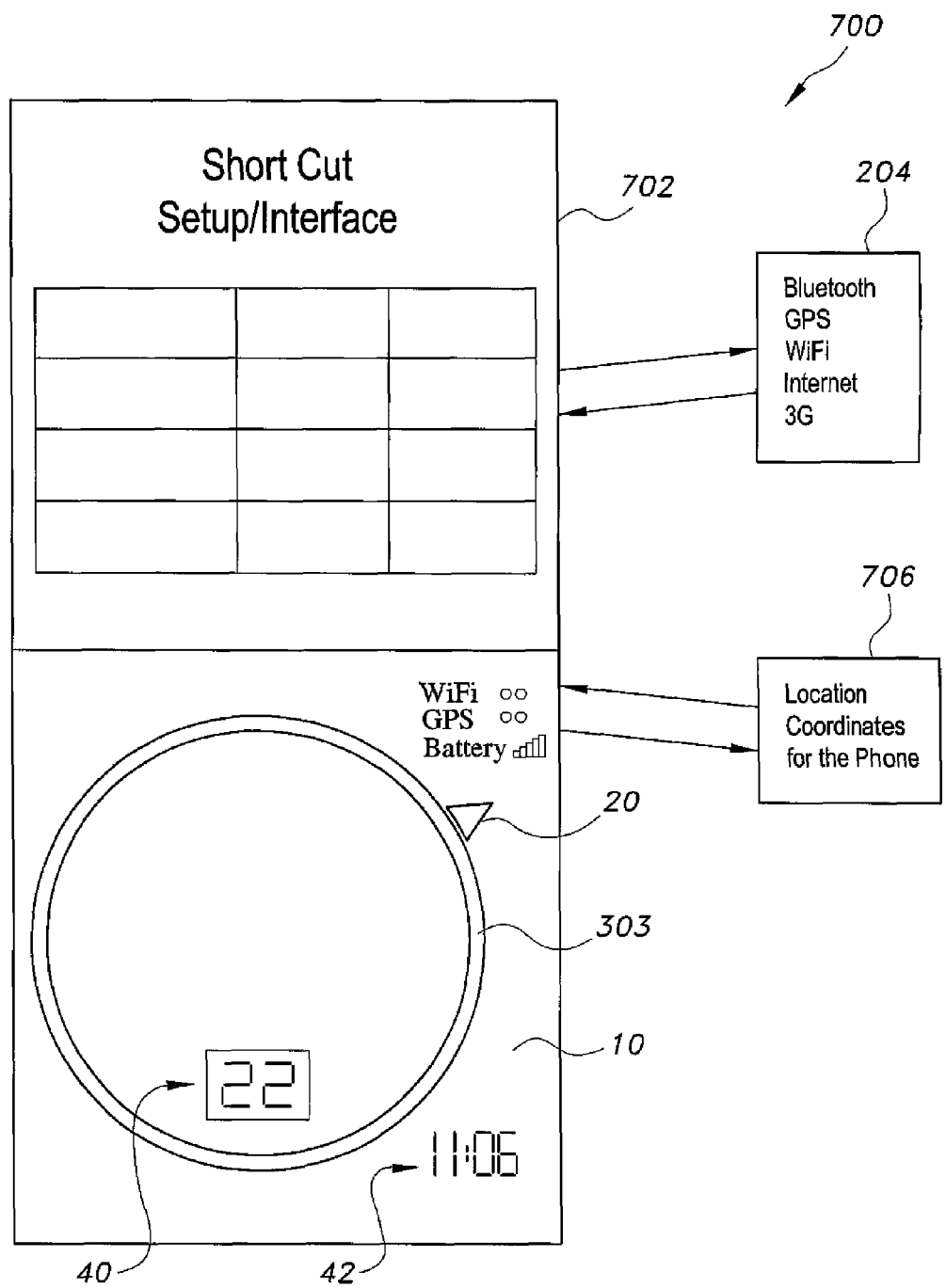
FIG. 7 is a block diagram of locating software for smartphone and PC according to the present invention, showing the smartphone systems interfaces.
Figure 8:
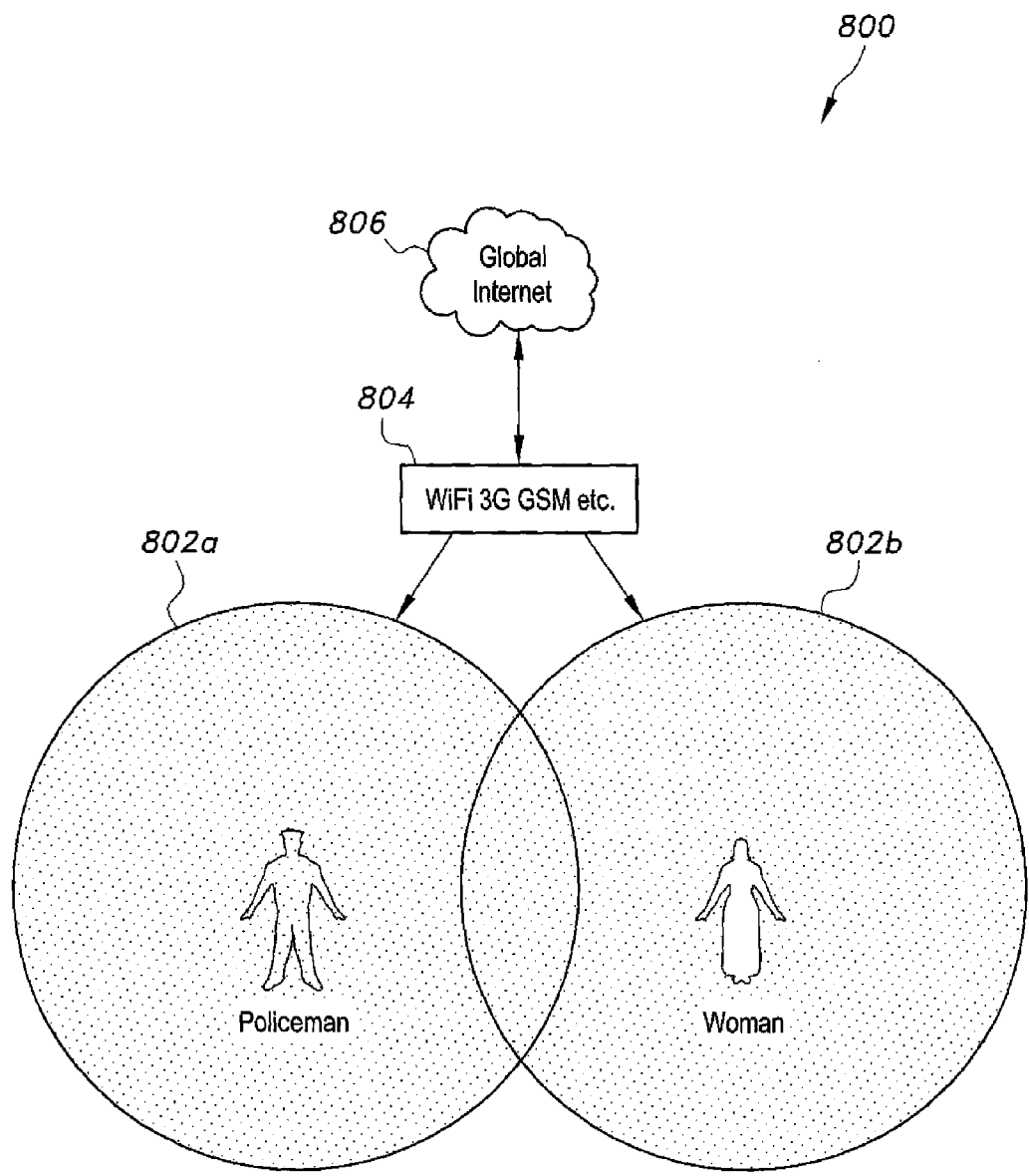
FIG. 8 is a system block diagram showing how location data can be exchanged via a communications infrastructure.

FIG. 7 shows the system configuration. The present software application, called "ShortCut," is installed on user device 702 and presents the UI 10 on the device 702. The present software application utilizes Bluetooth, GPS, Wi-Fi, Internet, 3G, 4G, LTE, and the like, as a communication system 204 for direction finding and ranging of target users. A storage system 706 maintains the location coordinates for the user's device 702. As shown in FIG. 8, the system 800 allows location data to be exchanged via a communications infrastructure 804 over the global Internet 806 when the respective user's ranges 802a and 802b overlap. FIG. 9 shows a contact list 900, which the present software application provides for all users to customize. Entry/display fields include a Nickname field 902, an Offer field 904, and a "Show" field 906. A blank field 905 is available for future development and may hold descriptive attributes a contact may have, e.g., acceptable hourly rate range, salary, physical description, and the like. If the user does not know the name of the contact, but only an offer to be solicited, then the user just fills out the offer column, leaving the NickName blank. The NickName and Offer columns have fields that allow the user to create, retrieve, update, and delete (CRUD) the data entries.

The "Show" indicators 907a, 907b are touch-activated toggle switches displayed in the "Show" column 906. A darkened "Show" indicator 907b indicates that the user has selected the row for a local search of persons, and location data (subject to permissions settings in a similar table displayed on the contact's device) will be exchanged between the user and the contact. A faded/light colored indicator 907a turns off the search for the affected row.

It is to be understood that the present invention is not limited to the embodiments described above, but encompasses any and all embodiments within the scope of the following claims.

I claim:

1. A computer software product, comprising a medium readable by a processor, wherein the medium is a non-transitory computer readable media, the medium having stored thereon a set of instructions for locating persons of interest to a user of a wireless enabled device, the computer software product being installed on the wireless enabled device, the set of instructions including:

(a) a first sequence of instructions which, when executed by the processor, causes said processor to access geo-location data of the user, the geo-location data being provided via a communications infrastructure in operable communication with the wireless enabled device;

(b) a second sequence of instructions which, when executed by the processor, causes said processor to provide a contact table displayable in a user interface of the wireless enabled device, said contact table having a plurality of columns, including at least a nickname column, an offer column, and a show column, wherein each one of the nickname column and offer column includes fields for creating, retrieving, updating, and deleting data, the nickname and offer columns being maintainable by the user, the show column being a toggle switch for selectively activating and deactivating a corresponding row of the contact table, when a corresponding row is activated, an enabling of geo-location data exchange between the user and other users of the computer software product occurs, and when a corresponding row is deactivated, a disabling of geo-location data exchange between the user and other users of the computer software product occurs, wherein the other users being designated in the contact table; and (c) a third sequence of instructions which, when executed by the processor, causes said processor to display, via a user interface screen, the geo-location data of the other users on the wireless enabled device, the display having:

a circular range indicator indicating geo-location range of the user;

a direction indicator indicating direction to at least one of the other users of the computer software product, the direction indicator being formed as a triangular pointer floating above the circular range indicator;

a calling/response button disposed outside the lower periphery of the circular range indicator, the calling/response button initiating instant messaging IM between the user and the at least one of the other users;

a digital numeric distance indicator disposed on top of and inside the lower periphery of the circular range indicator, the digital numeric distance indicator indicating distance between the user and at least one of the other users;

a digital numeric time indicator disposed outside the lower periphery of the circular range indicator opposite the calling/response button; and a profile information display field disposed inside of the circular range indicator, the profile information display displaying profile information of the at least one other user.

2. The computer software product according to claim 1, further comprising a fourth sequence of instructions which, when executed by the processor, causes said processor to display the geo-location data of the at least one other user only if the at least one other user has set privacy permission settings to allow the at least one other user's geo-location data to be exchanged.

3. The computer software product according to claim 2, further comprising a fifth sequence of instructions which, when executed by the processor, causes said processor to broadcast the user's geo-location data and an Instant Message "Help" message to all first responders in possession of a wireless enabled device executing the computer software product and in range of the user.

4. The computer software product according to claim 3, further comprising a sixth sequence of instructions which, when executed by the processor, causes said processor to determine the geo-location range by strength of Bluetooth signals received by the user's wireless enabled device.

5. The computer software product according to claim 3, further comprising a seventh sequence of instructions which, when executed by the processor, causes said processor to exchange geo-location data only with a user-designated type of first responder when multiple types of first responders are in range of the user.

6. The computer software product according to claim 3, further comprising an eighth sequence of instructions which, when executed by the processor, causes said processor to actuate a beeper and display a beep indicator in the user interface to let the user know contact messaging has been activated.

* * * * *